United States Patent [19]

Harrison et al.

[11] Patent Number: 4,785,322
[45] Date of Patent: Nov. 15, 1988

[54] INFRARED WINK RANGING SYSTEM

[75] Inventors: George C. Harrison, Chelmsford; George D. Whiteside, Lexington, both of Mass.

[73] Assignee: Polaroid Corporation, Cambridge, Mass.

[21] Appl. No.: 131,095

[22] Filed: Dec. 10, 1987

[51] Int. Cl.$^4$ .......................... G03B 3/00; G03B 13/18
[52] U.S. Cl. .................................... 354/403; 354/415; 354/482
[58] Field of Search .................... 354/403, 415, 482

[56] References Cited

U.S. PATENT DOCUMENTS

| | | | |
|---|---|---|---|
| 3,173,347 | 3/1965 | Stimson et al. | 95/10 |
| 3,583,299 | 6/1971 | Land | 95/10 |
| 4,066,884 | 1/1978 | Taylor | 362/16 |
| 4,304,476 | 12/1981 | Bloom | 354/49 |
| 4,316,659 | 2/1982 | Daniels . | |
| 4,351,593 | 9/1982 | Johnson et al. | 354/482 |
| 4,357,083 | 11/1982 | Johnson et al. | 354/22 |
| 4,358,186 | 11/1982 | Johnson et al. | 354/482 |
| 4,415,245 | 11/1983 | Harvey | 354/25 |
| 4,457,611 | 7/1984 | Ishida et al. | 354/415 |
| 4,473,285 | 9/1984 | Winter | 354/403 |
| 4,549,801 | 10/1985 | Winter | 354/403 |

FOREIGN PATENT DOCUMENTS 2110828  6/1983  United Kingdom .

*Primary Examiner*—Russell E. Adams
*Attorney, Agent, or Firm*—David R. Thornton

[57] ABSTRACT

A black, infrared pass filter is disposed in front of the strobe element of an automatic rangefinding camera to provide an infrared ranging wink for ranging during the pre-exposure steps of a camera cycle. As the cycle continues, the filter is temporarily displaced from in front of the strobe element to allow a visible light, flash firing for scene illumination. Once the exposure firing is complete, the filter resumes its original position in front of the strobe element such that the filter allows only infrared light to be transmitted from the strobe element except during exposure strobe firing.

6 Claims, 2 Drawing Sheets

INFRARED WINK RANGING SYSTEM

BACKGROUND OF THE INVENTION

This invention relates to photographic systems which employ an infrared ranging system and, more particularly, it concerns such systems in which infrared light emitted from a camera mounted flash source is used for rangefinding during an exposure cycle irrespective of whether exposure is effected by flash or ambient light.

Automatic ranging cameras are known to use a preliminary flash increment of illumination or "wink" to determine the camera-to-subject distance by measuring the subject reflected component of the wink and relating the intensity of that component to distance for lens focusing adjustment. Such cameras incorporate a photocell to detect the amount of wink radiation reflected by the subject and appropriate electronic circuitry to compare the reflected radiation value either to an initial radiation value or with the intensity value of the wink in order to compute the camera-to-subject distance. While such wink light systems are effective as rangefinders, when the source of the wink is visible light, the subject being photographed may be disturbed, or the rangefinding accuracy hampered by differing values of scene reflectivity. Accordingly, photographic systems employing an infrared ranging wink have been disclosed to avoid disturbance to the subject and to reduce the adverse influence of variations in scene reflectivity.

The use of a preliminary infrared flash or wink in advance of a main flash of visible light to determine the camera-to-subject distance by detecting reflected infrared radiation is known in photographic systems which employ two separate flash elements; one flash element producing the infrared wink and the other flash element producing the visible light exposure flash. One example of such a ranging system is described in U.S. Pat. No. 4,457,611 entitled "PHOTOGRAPHIC SYSTEM FOR USE IN FLASH PHOTOGRAPHY WITH A CAMERA", issued on July 3, 1984 to T. Ishida et al. The preliminary infrared wink is produced by a preliminary flash tube behind a filter which cuts off visible light and allows infrared light to pass. For exposure, a main flash of visible light is produced by a separate flash tube. In addition to the requirement for two separate flash tubes, this type of system requires a complicated dual control system, takes up camera space, increases the consumption of energy, and increases the cost of manufacture.

Another known photographic ranging system employs a single flash tube which emits both a preliminary visible light flash or wink and a main visible light flash. The reflected light energy sensor in this system includes a filter which blocks out all the visible light and allows only infrared light to pass through the sensor element. Examples of such ranging systems incorporated in automatic ranging cameras are disclosed in U.S. Pat. No. 4,357,083 entitled "METHOD AND APPARATUS USING WEIGHTED RANGE SIGNAL FOR CONTROLLING PHOTOGRAPHIC FUNCTIONS", issued to B. K. Johnson et al on Nov. 2, 1982; U.S. Pat. No. 4,549,801 entitled "AUTOMATIC FOCUSING CAMERA WITH AUTOMATIC APERTURE SETTING", issued to A. J. Winter on Oct. 29, 1985 and British Published Patent Application No. 2,110,828 entitled "AUTOMATIC FOCUSING" issued to A. J. Winter on June 22, 1983. All three of these systems suffer the drawback that the preliminary flash includes visible light which may cause the subject being photographed to react to the preliminary flash by blinking, for example, and result in a picture with such undesirable characteristics as partially or fully closed eyes in the face of a human subject.

As disclosed in U.S. Pat. No. 4,415,245 entitled "MOVABLE INFRARED FILTER FOR AN AUTO RANGING CAMERA", issued to D. M. Harvey on Nov. 15, 1983, a visible light blocking filter is placed in front of a single camera mounted flash tube for the ambient mode operation when flash exposure is not provided. In this mode, the visible light blocking filter is placed in front of the flash tube during a pre-exposure flash or wink for ranging purposes so that the automatic focusing system is operated without disturbing the subject or surroundings to be photographed during the ranging operation. However, in the flash mode where an exposure flash is desired, this system does not utilize the visible light blocking filter, and thus requires the emission of a rangefinding light flash or wink of visible light when a main light flash is desired for exposure.

The pre-exposure flash or wink ranging photographic systems of the prior art, therefore, suffer the drawbacks either of being overly complicated by the requirement of two separate flash tubes or of being disturbing to the subject or surroundings to be photographed by use of visible light for the preliminary flash or wink.

SUMMARY OF THE INVENTION

In accordance with the present invention, an improved method and apparatus are provided for producing both an infrared ranging wink and a visible flash developed by a single camera mounted flash lamp operative to supply flash illumination for exposure, when desired. The infrared ranging wink is effective during each exposure cycle irrespective of whether exposure is by flash or ambient illumination.

The invention is embodied in a camera having a strobe flash unit presented in a forwardly facing wall component thereof, the flash unit normally being covered by a black appearing, visible block, infrared pass filter mounted to the wall component for movement, after the flash unit is energized to emit a ranging wink, to a retracted position displaced from the flash unit so that the unit is available to emit an exposure illumination, visible light flash. The filter, when positioned over the flash unit, blocks visible light emitted by the strobe or flash unit toward the scene so that during a preliminary energization of the flash unit, an infrared wink is transmitted from the camera to the photographic subject for ranging purposes. The filter is then displaced from the flash unit during the same exposure cycle to make available the visible light of the flash for exposure illumination. Under conditions where fill-in or full flash is undesired for exposure of the camera contained film, the filter can be retained in its normal position, covering the flash unit.

An object of the present invention is to provide a photographic system employing a preliminary infrared ranging wink in both flash and ambient operation. Another object of the present invention is to provide an automatic rangefinding camera having a single flash element to produce both a pre-exposure infrared ranging wink and a flash of visible light for exposure illumination. A still further object of the present invention is the provision of a simplified method of producing an infrared ranging wink whether or not a visible light exposure flash is desired. Yet another object of the invention is to provide an infrared ranging wink system of the type referred to which results in an aesthetically pleasing cover of the camera mounted flash unit at all times except during a short period encompassing the energization of the flash unit to emit exposure illumination.

Other objects and further scope of application of the present invention will become apparent from the detailed description to follow, taken in conjunction with the attached drawings in which like parts are designated by like reference characters.

DETAILED DESCRIPTION OF THE PREFERRED EMBODIMENT

Figure 1:
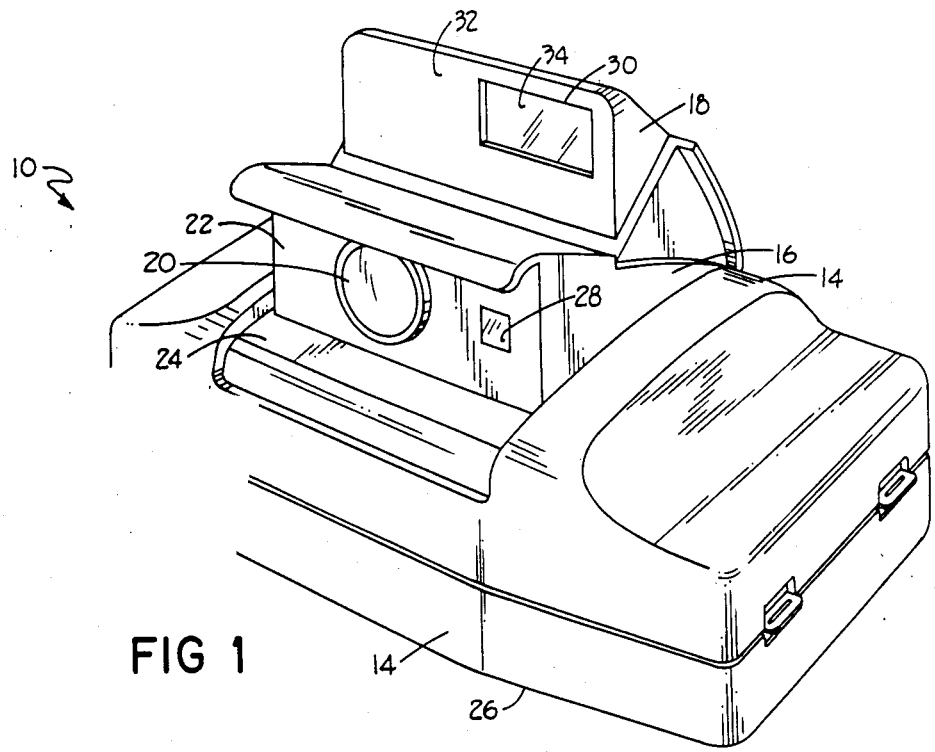
FIG. 1 is a perspective view of an automatic rangefinding camera incorporating the present invention.

In FIG. 1 of the drawings, an exemplary embodiment of the present invention is shown incorporated in a camera generally designated by the reference numeral 10. The camera 10 includes a base section 14 and a shutter housing section 16 and strobe housing 18, both of which are hingedly connected at their rear edges to the base section 14 for movement between an erected or open position, as shown, and a folded or closed position (not shown). In the erect position, a variable focus, objective lens 20, carried on the front face 22 of the shutter housing 16 is presented above a front apron portion 22 of the lower base section 14.

The base 14 is configured to receive photographic film for presentation in a film plane (not shown), mounted parallel to the lower surface 26 of the base, for exposure to scene light rays transmitted through the lens 20. For exposure, light is transmitted in a conventional manner from the lens through a shutter (not shown) and reflected from an inclined mirror (not shown) to the film presented at the film plane. For light evaluation, a photocell window 28 is also presented in the face 22, and a strobe window 30 is presented in the front face 32 of the strobe housing 18 when the latter is in its erect position as shown.

As illustrated, the camera 10 is intended to be a single lens reflex (SLR) camera wherein a viewing lens (not shown) is presented in the rear of the camera for scene viewing. Additionally, the camera carries an actuator button 56, shown in FIG. 4 but hidden from view on the right side of the camera 10 in FIG. 1, for actuation of the camera through an exposure cycle.

Figure 2:
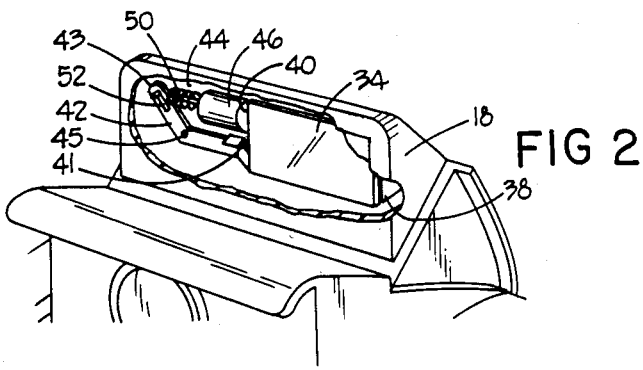
FIG. 2 is a fragmentary perspective view of the camera of FIG. 1 with portions cut away so as to more clearly illustrate the infrared filter of the invention in its operative position.
Figure 3:
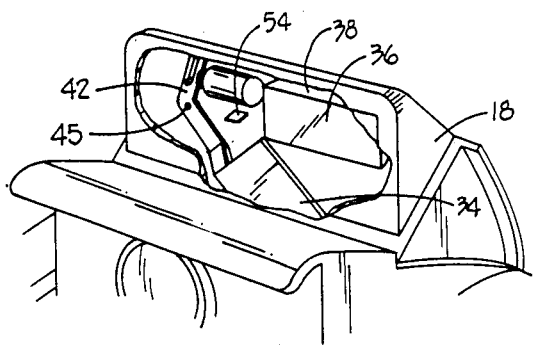
FIG. 3 is a fragmentary perspective view of the camera of FIG. 1 with portions cut away to illustrate the displacement of the filter from the camera strobe unit according to one embodiment of the invention.

In accordance with the present invention, a visible light blocking or "black" filter 34, as is more particularly illustrated in FIGS. 2 and 3, is supported within the flash housing 18 for movement between a normal blocking or operative position in which it covers the front face 36 of a strobe 38 so as to block visible light but pass infrared, and a displaced or inoperative position shown in FIG. 3 in which all light emitted by the strobe unit (both visible and infrared) is directed forwardly of the camera 10. The strobe unit 38 is a conventional strobe which emits both visible light and infrared frequencies. The blocking filter 34 is made from or coated by a material which blocks the passage of visible light but passes infrared radiation, such as a black plastic material, for example, but a variety of materials or combination of materials known to block visible light and pass infrared radiation might be used.

The filter 34 is affixed at its left edge 40 by adhesive or other means to one end 41 of a bell crank lever 42 which is mounted on a support plate 44 for pivotal movement around a pivot post 45. A solenoid 48 is fixedly mounted to the plate 44 with its plunger 50 in connection to the other end 43 of the lever 42 so as to provide clockwise rotation of the lever (and the filter 34) upon energization of the solenoid 46 and, in turn, to displace the filter 34 to its inoperative position shown in FIG. 3. Deenergization of the solenoid 46 returns the lever 42 to its position shown in FIG. 2 under the urging of a spring 52 mounted on the plunger 50. A stop member 54 is engaged by the lever 42 to retain the filter 34 (under the bias of the spring 52) in its normal position over the face 36 of the flash unit 38.

In the illustrated embodiment, the filter 34 is pivoted from its left-hand edge 40 around an axis normal to the plane of the filter, however, various mounting arrangements may be utilized. For example, the filter 34 may be pivoted downwardly around its right edge or rotated forwardly around an axis parallel to the plane of the filter. In the latter case, the filter would preferably be mounted within a recess (not shown) in the face 32 of the flash housing so as to allow such forward rotation. Additionally, the filter may be mounted in the camera for slidable downward movement, or provided as a flexible member in a window shade arrangement wherein it is coiled near one edge of the flash face in its inoperative position and uncoiled and drawn across the face into its normal blocking position.

Figure 4:
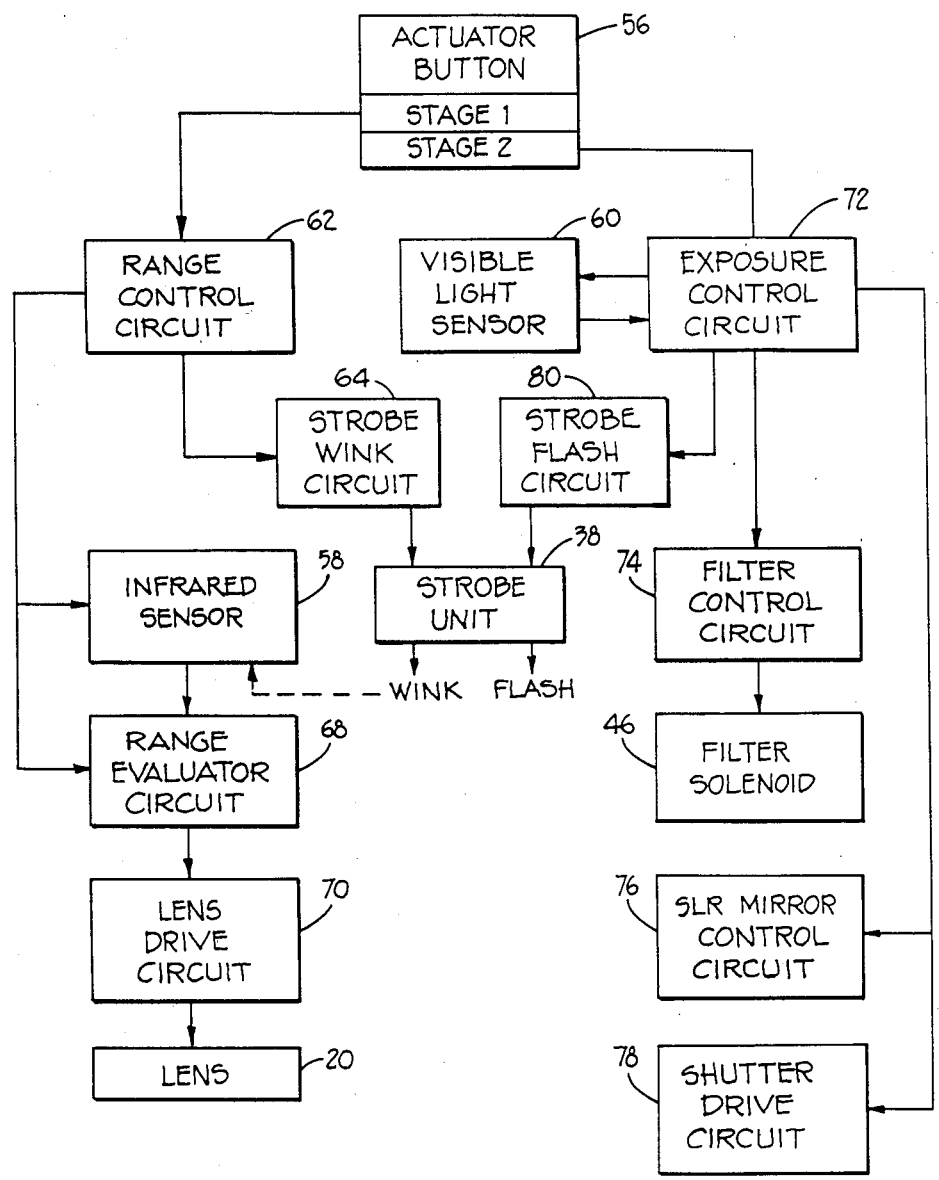
FIG. 4 is a block diagram of the major control circuits of the automatic rangefinding camera according to one embodiment of the present invention.

In FIG. 4, an exemplary embodiment of the electronic control system of the SLR camera 10 is diagrammatically represented in block diagram form. The camera actuator button 56, provided to initiate a camera cycle, includes a two-stage arrangement as is often conventional in automatic cameras, with the first stage providing operation of pre-exposure functions and the second stage providing film exposure. As shown in FIG. 4, an infrared sensor 58 and a visible light sensor 60 are provided in the camera 10 in operative relation to the photocell window 28. Although the infrared and visible light sensors 58 and 60 are shown in FIG. 4 as separate elements, they may be incorporated in a single molded sensing unit made up of dual silicon photodiodes with the visible light sensor covered by a visible pass filter and the infrared sensor covered by an infrared pass filter similar to the filter 34. It should, of course, be understood that while it is preferable to provide reading of only infrared from the wink firing, the latter could also be provided by a cell which reads both visible and infrared.

In operation of the camera system shown in FIG. 4, depression of the button 56 through only its stage 1 activates (from a conventional power source, not shown) a range control circuit 62 which in turn enables the infrared sensor 58, a strobe wink circuit 64, a range evaluator circuit 68, and a lens drive circuit 70. Upon activation, the range control circuit 52 fires the strobe unit 38 to produce a wink flash by way of the strobe wink circuit to produce a lower power or shortened operation of the strobe unit. For example, the wink control circuit produces a fire signal for the flash unit 38 and a quench signal as the strobe unit reaches its peak so as to conserve power during the ranging wink.

At this stage of the operation, the filter 34 is in position in front of the strobe unit 38 such that the wink flash emitted through the filter 34 contains non-visible, i.e., infrared radiation only. In turn, the reflection of this non-visible wink is evaluated by the infrared sensor 58 and passed to the range evaluator circuit 68. The latter compares the infrared value of the infrared radiation both prior to and during the wink and converts the determined value of the reflected radiation from the wink to subject distance in a conventional manner, and energizes the lens drive circuit 70 to advance the lens 20 to a proper focal position in accordance with the determined subject distance. This completes the ranging and focusing portion of the camera cycle.

If the actuator button 56 is then or has previously been pushed through stage 1 to stage 2, the exposure portion of the cycle is commenced. In the latter, an exposure control circuit 72 is activated and, in turn, activates and reads the visible light sensor 60 to evaluate scene lighting.

Where the recorded scene lighting is of a low enough value to require a flash (or where fill flash is desired), the exposure control circuit 70 activates a filter control circuit 74 which energizes the filter solenoid 46 to displace the latter to its blocking position shown in FIG. 3. Thus, activation of the solenoid 46 draws the solenoid plunger 50 into the solenoid and rotates the lever 42 in a clockwise direction (against the bias of the spring 52) to displace the filter 34 to its inoperative position shown in FIG. 3.

During the latter movement, the camera SLR mirror (not shown) is also moved from its viewing position to its exposure position by means of an SLR mirror control circuit 76, and actual exposure commenced by means of a shutter drive circuit 73, all under the direction of the exposure control circuit 72. In the illustrated camera, the SLR mirror is normally overlying the focal plane in light blocking relation to the frame or sheet of film presented thereat, and the shutter is normally open to permit scene viewing by the camera operator. Hence, the exposure control circuit 72 first closes the shutter (not shown), then moves the mirror to its inclined, exposure position and reopens the shutter to initiate film exposure.

Then, in synchronism with a given point in the reopening of the shutter for exposure, the exposure control circuit signals a strobe flash circuit 80 to fire the strobe unit 38 to produce an exposure flash. At this time, since the filter 34 has been displaced to its inoperative position shown in FIG. 3, the strobe illuminates the scene not only at greater power than in the wink flash, but also with visible light in addition to infrared. At completion of the flash or the exposure, the exposure control circuit 72 resets the camera 10, including deenergization of the filter solenoid which allows the filter 34 to return to its normal position against the stop 54 under the bias of the plunger spring 52 so that the filter is again in its blocking position in front of the strobe unit 38 in preparation for the next ranging wink.

As illustrated in FIG. 4, the wink and flash control circuits 64 and 80 are shown for clarity as separate from the flash unit 38, although in practice they would preferably be incorporated in the latter unit.

The camera operation as described above is related to fill or flash mode operation where supplemental scene illumination is desired; however, where ambient mode operation is desired, generally at high light levels, the strobe can be held inoperative, in which case the filter 34 can be allowed to remain in its operative position or displaced even though unnecessary, if such provides reduced circuit complexity. In fact, it should be understood that ambient mode operation can be restricted solely to scenes in which the subject is beyond flash range, with fill-in or full flash provided for all other scenes.

As described with respect to FIG. 4, pre-exposure evaluation of the visible scene light is accomplished in the early stages of the exposure portion of the camera cycle, however, this operation can and often is provided during the first stage activation. It should also be understood that the invention is equally applicable to a non-SLR or "viewfinder" camera and that a cycle of operation using a non-SLR camera is similar to that described in regard to FIG. 4, except that the mirror (not shown) would be permanently in the exposure position, and the normal or rest condition of the camera shutter would be closed. Thus, in such a camera, depressing the shutter button to its exposure activating position would displace the filter 34 and then move directly to opening and closing of the shutter and providing a flash to effect a flash exposure portion of the cycle.

As described, the filter 34 is preferably displaced to its inoperative position prior to opening of the shutter for exposure and returned following the closing of the shutter to thereby minimize any possible camera movement during actual exposure; however, in accordance with the invention, all that is required is displacement of the filter just prior to the visible light, exposure flash and return of the filter to its blocking position just subsequent to that flash.

The electrical control system of FIG. 4 may be varied in many ways and still accomplish the same result. For example, the wink ranging circuit 64 may send a camera-to-subject distance signal to a distance display panel (not shown) which will display a distance indication such as a digital readout for the camera operator for manual adjustment of the focusing of the camera lens 22.

Hence, as described above, the visible light blocking or black filter 34 is normally in its blocking position shown in FIGS. 1 and 2, and is displaced to its blocking or inoperative position (See FIG. 3) only when a visible light, exposure flash is directed at the scene, such that the subject or surroundings being photographed are exposed to only nondisturbing infrared radiation during the ranging portion of an exposure cycle. Thus, it will be appreciated that the present invention provides a highly effective, single-strobe unit photographic system which does not unnecessarily disturb the subject being photographed. Additionally, the black filter of the present invention aesthetically improves the appearance of the camera by masking the shine and reflectivity of the strobe unit and by improving the camera's color continuity.

It will be apparent from the preceding description and is contemplated that modifications and/or changes may be made in the illustrative embodiments without departure from the invention. Accordingly, it is expressly intended that the foregoing description and accompanying drawings are illustrative only, not limiting, and that the true spirit and scope of the present invention is to be determined by reference to the appended claims.

What is claimed is:

1. In a photographic camera having a strobe unit for emtting a flash containing both visible and infrared light, and means for initiating an exposure cycle including activation of the strobe unit to provide a pre-exposure flash for determining subject distance and an exposure flash for illuminating the photographic scene during film exposure, the improvement comprising:

a filter for blocking visible illumination and passing infrared radiation;

means for mounting said filter on the camera for movement between a first position in which it is in blocking relation to emissions from said strobe unit directed toward the scene and a second position in which it is displaced from said strobe unit to allow unobstructed passage or light emitted by said unit toward the scene; and means for automatically displacing said filter during a single exposure cycle from its said first to its said second position after activation of said strobe unit to provide the pre-exposure flash, thereby automatically providing illumination of the scene with infrared illumination for distance determination and visible light from said strobe unit for film exposure.

2. A photographic camera comprising:

a camera actuator;

an electronic flash unit operable to direct illumination along a given path to the scene to be photographed, said flash unit providing both visible and infrared illumination;

an infrared pass filter mounted for movement between a first position in blocking relation to said given path and a second position in unblocking relation to said given path;

drive means operable for displacing said filter between its first and second position; and means responsive to operation of said actuator for firing said flash unit prior to film exposure to produce a pre-exposure flash for determining subject distance, for actuating said camera to provide a film exposure, and for firing said flash unit during said film exposure to produce an exposure flash for providing at least supplemental scene illumination for film exposure, said actuator responsive means including means for operating said drive means to displace said filter from its first to its said second position following said pre-exposure flash and prior to said exposure flash such that visible illumination emitted by said flash unit is blocked from said scene during said pre-exposure flash and transmitted to said scene during said exposure flash.

3. The camera of claim 2 wherein said actuator responsive means additionally operates said drive means to return said filter to its said first position following said exposure flash.

4. The camera of claim 2 wherein said filter is mounted for pivotal movement around an axis generally normal to the plane of said filter.

5. A method of operating an automatic rangefinding camera having a strobe unit, said method comprising the steps of:

placing a visible light blocking, infrared pass filter in a blocking position in front of said strobe element;

producing an infrared wink by firing said strobe element with said filter in its said blocking position;

determining subject distance in accordance with the reflection of said wink from the scene to be photographed;

then displacing said blocking filter from its said blocking position in front of said strobe element; and exposing a frame of film retained in said camera and producing a visible light exposure flash during said exposure by firing said strobe element.

6. The method of claim 5 further comprising the step of replacing said blocking filter in said position in front of said strobe element following said producing of an exposure flash in preparation for the next ranging wink.

* * * * *